(12) United States Patent
Nuttall et al.

(10) Patent No.: US 12,084,338 B2
(45) Date of Patent: Sep. 10, 2024

(54) METHOD AND APPARATUS FOR CUSTOMIZED FILTRATION AND ENHANCEMENT OF DRINKING WATER

(71) Applicant: Quench USA, Inc., King Of Prussia, PA (US)

(72) Inventors: Andrew Troy Nuttall, Queen Creek, AZ (US); Todd Chamberlain Peterson, Haverford, PA (US); Theodore Hertz, Lower Gwynedd, PA (US)

(73) Assignee: QUENCH USA, INC., King of Prussia, PA (US)

( * ) Notice: Subject to any disclaimer, the term of this patent is extended or adjusted under 35 U.S.C. 154(b) by 0 days.

(21) Appl. No.: 18/133,635

(22) Filed: Apr. 12, 2023

(65) Prior Publication Data

US 2023/0331537 A1    Oct. 19, 2023

Related U.S. Application Data

(60) Provisional application No. 63/330,439, filed on Apr. 13, 2022.

(51) Int. Cl.
*B67D 1/12* (2006.01)
*B01D 29/56* (2006.01)
(Continued)

(52) U.S. Cl.
CPC .............. *B67D 1/12* (2013.01); *B01D 29/56* (2013.01); *B01D 29/60* (2013.01); *B01D 35/147* (2013.01);
(Continued)

(58) Field of Classification Search
None
See application file for complete search history.

(56) References Cited

U.S. PATENT DOCUMENTS

| 6,672,097 | B1 * | 1/2004 | Ashley | A23G 9/163 |
|---|---|---|---|---|
| | | | | 62/340 |
| 11,608,277 | B1 * | 3/2023 | Sawicki | E03B 3/04 |

(Continued)

OTHER PUBLICATIONS

International Search Reporting and Written Opinion issued Jul. 7, 2023 in International Applicationi No. PCT/US2023/18446.

*Primary Examiner* — Richard C Gurtowski
(74) *Attorney, Agent, or Firm* — Panitch Schwarze Belisario & Nadel LLP (57) ABSTRACT

A water-dispensing device includes a source water intake, a spigot, and first and second filters arranged between the intake and the spigot. The first filter includes a first inlet and outlet. At least the first inlet includes a first electrically controlled valve for selectively placing the first filter in fluid communication with the intake. The second filter includes a second inlet and outlet. At least the second inlet includes a second electrically controlled valve for selectively placing the second filter in fluid communication with the intake. A controller is configured to: (i) receive a water selection from a user, and (ii) configure the first and second valves based on the selection such that water flowing from the intake toward the spigot will enter any of the first and second filters corresponding to the selection and bypass any of the first and second filters that do not correspond to the selection.

18 Claims, 6 Drawing Sheets

(51) Int. Cl.
    *B01D 29/60*      (2006.01)
    *B01D 35/147*      (2006.01)
    *B01D 35/157*      (2006.01)
    *B67D 1/00*      (2006.01)
    *B67D 1/08*      (2006.01)
    *C02F 1/00*      (2023.01)
    *C02F 1/44*      (2023.01)
    *C02F 1/68*      (2023.01)

(52) U.S. Cl.
    CPC ....... *B01D 35/1573* (2013.01); *B67D 1/0014* (2013.01); *B67D 1/0888* (2013.01); *C02F 1/003* (2013.01); *C02F 1/008* (2013.01); *C02F 1/441* (2013.01); *C02F 1/68* (2013.01); *B67D 2210/0001* (2013.01); *C02F 2201/005* (2013.01); *C02F 2209/40* (2013.01); *C02F 2301/043* (2013.01); *C02F 2307/10* (2013.01); *E03C 2201/40* (2013.01)

(56) References Cited

U.S. PATENT DOCUMENTS

| | | | |
|---|---|---|---|
| 2011/0147284 A1 | 6/2011 | Barker et al. | |
| 2013/0313191 A1* | 11/2013 | Wolf | C02F 9/00 210/638 |
| 2016/0368753 A1* | 12/2016 | Bethuy | A47J 31/4403 |
| 2019/0161334 A1 | 5/2019 | Knoll et al. | |
| 2022/0024748 A1 | 1/2022 | Fantappie et al. | |

* cited by examiner

METHOD AND APPARATUS FOR CUSTOMIZED FILTRATION AND ENHANCEMENT OF DRINKING WATER

CROSS-REFERENCE TO RELATED APPLICATIONS

This application claims the benefit of U.S. Provisional Patent Application No. 63/330,439, filed Apr. 13, 2022, entitled "Method and Apparatus for Customized Filtration and Enhancement of Drinking Water," the entire contents of which are incorporated by reference herein.

BACKGROUND

Embodiments described herein relate generally to methods and apparatuses for the customized filtration and enhancement of drinking water, and more particularly, to such customization and enhancement via selective use and/or bypass of additive and/or reductive filters arranged in series.

Traditional point-of-use water coolers typically tap into a building's existing source water, which may then be filtered, chilled, stored, and eventually dispensed for consumption on demand by an end user. Filtration by these types of water coolers conventionally involves the use of one or more filters placed in series, each of which performs a different function but which collectively are designed to remove contaminants that can degrade the smell, taste, or safety of the source water. Certain water coolers, such as those employing reverse osmosis filtration, may include a filter at the end of the series that is additive, rather than reductive in nature, and is designed to re-introduce, via the addition of minerals, alkalinity to the water that is removed during the reverse osmosis process. More recently, some water-dispensing devices have been implemented that both filter and enhance water, but such devices typically operate upon insertion of capsules or pouches filled with powders and liquids, rather than the use of filters, which are already widely used in the point-of-use water cooler industry.

It is desirable to provide a water-dispensing device that allows a user to dispense drinking water that has been filtered and/or enhanced with various customized additives based on the user's selection from a menu of such enhancements. The device may filter and enhance the water based on the selection by selectively routing the source water through a series of relevant reductive or additive filters. It is further desirable to have the device prevent stagnation of water in filters that are used less frequently.

BRIEF SUMMARY

Briefly stated, one embodiment comprises a water-dispensing device including a source water intake, a spigot arranged downstream from the source water intake, and a first filter arranged between the source water intake and the spigot. The first filter includes a first inlet and a first outlet. At least the first inlet includes a first electrically controlled valve for selectively placing the first filter in fluid communication with the source water intake. A second filter is arranged between the source water intake and the spigot. The second filter includes a second inlet and a second outlet. At least the second inlet includes a second electrically controlled valve for selectively placing the second filter in fluid communication with the source water intake. A controller is configured to: (i) receive a water selection from a user, and (ii) configure the first valve and the second valve based on the received water selection such that water flowing from the source water intake toward the spigot will enter any of the first filter and second filter corresponding to the received water selection and bypass any of the first filter and second filter that do not correspond to the received water selection.

In one aspect, the water-dispensing device further includes a user interface in communication with the controller. The user interface provides a plurality of selectable options for the water selection. At least one of the selectable options corresponds to at least one of the first filter or the second filter. In another aspect, at least one of the selectable options corresponds to a combination of the first filter and the second filter. In yet another aspect, the user interface is a touchscreen. In still another aspect, the user interface further provides an option for selectively dispensing water from the spigot according to the water selection.

In another aspect, the second filter is configured to provide an additive to the water. In still another aspect, the additive is at least one of a mineral, an electrolyte, alkalinity, a vitamin, fluoride, caffeine, a flavor, or a combination of two or more of the foregoing.

In yet another aspect, the water-dispensing device further includes a drain line arranged downstream of the first and second filters and upstream of the spigot, and a purge valve configured to selectively divert water from the source water intake to the drain line. In still another aspect, the controller is further configured to perform a purging operation. The purging operation includes: (i) configuring the first valve and the second valve to allow water flowing from the source water intake toward the spigot to enter each of the first and second filters, (ii) actuating the purge valve to a position for diverting the water from the source water intake toward the drain line, and (iii) initiating water flow from the source water intake.

In a still further aspect, the water-dispensing device further includes a conditioning element arranged between the source water intake and the spigot. In yet another aspect, the conditioning element is one of a chill tank or a water heater.

In a still further aspect, the first filter is one of a sediment filter, a carbon filter, or a reverse osmosis filter.

In yet another aspect, the first and second outlets each include a check valve to prevent water from flowing into the respective first and second filters through the respective first and second outlets.

In a further aspect, the water-dispensing device further includes one or more additional filters. Each of the one or more additional filters is arranged between the source water intake and the spigot and includes an inlet and an outlet. At least the inlet of each of the one or more additional filters includes an additional electrically controlled valve for selectively placing the respective additional filter in fluid communication with the source water intake. The controller is further configured to configure the additional valves of each of the one or more additional filters based on the received water selection such that water flowing from the source water intake toward the spigot will enter any of the one or more additional filters corresponding to the received water selection and bypass any of the one or more additional filters that do not correspond to the received water selection.

Another embodiment comprises a method for operating a water-dispensing device having a controller and first and second filters arranged between a source water intake and a downstream spigot. The first filter has a first inlet and a first outlet. At least the first inlet includes a first electrically controlled valve. The second filter has a second inlet and a second outlet. At least the second inlet includes a second electrically controlled valve. The method includes receiving, by the controller, a water selection from a user, configuring, by the controller, the first valve and the second valve based on the received water selection such that water flowing from the source water intake toward the spigot will enter any of the first filter and second filter corresponding to the received water selection and bypass any of the first filter and second filter that do not correspond to the received water selection, and initiating, by the controller, water flow from the source water intake.

In one aspect, the water-dispensing device further includes a drain line arranged downstream of the first and second filters and upstream of the spigot and a purge valve for performing a purging operation. The method further includes configuring, by the controller, the first valve and the second valve to allow water flowing from the source water intake toward the spigot to enter each of the first and second filters, actuating, by the controller, the purge valve to a position for diverting the water from the source water intake toward the drain line, and initiating, by the controller, water flow from the source water intake. In another aspect, the actuating of the purge valve for diverting water toward the drain line is performed in response to the controller determining that a predetermined or pre-scheduled time for a purging operation has been reached. In yet another aspect, the actuating of the purge valve for diverting water toward the drain line is performed in response to the controller receiving a selection by the user for completing a purging operation.

In still another aspect, the water-dispensing device further includes one or more additional filters. Each of the one or more additional filters is arranged between the source water intake and the spigot and includes an inlet and an outlet. At least the inlet of each of the one or more additional filters includes an additional electrically controlled valve. The method further includes configuring, by the controller, the additional valves of each of the one or more additional filters based on the received water selection such that water flowing from the source water intake toward the spigot will enter any of the one or more additional filters corresponding to the received water selection and bypass any of the one or more additional filters that do not correspond to the received water selection.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
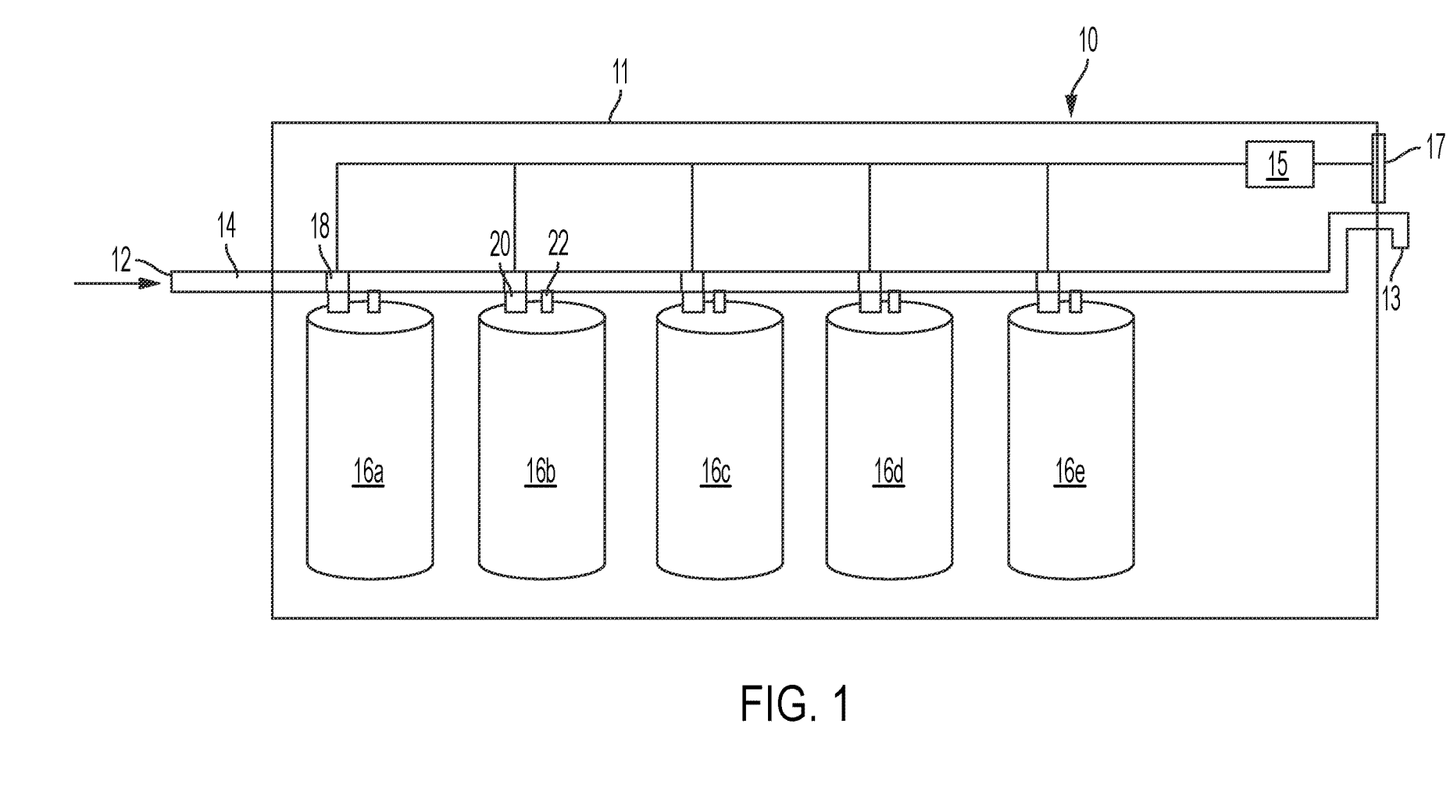
FIG. 1 is a schematic block diagram of a first example embodiment of a water-dispensing device in accordance with the present invention.

Referring to FIG. 1, there is shown a first example embodiment of a water-dispensing device 10 in accordance with the present invention. The water-dispensing device 10 may be of any conventional type, such as a free-standing dispenser, a countertop dispenser, a faucet dispenser, a coffee maker, or the like. The water-dispensing device 10 may be connected to a water source (not shown) via a source intake 12 that can be in fluid connection, either directly or indirectly, to a main conduit 14. The water source may be, for example, a building water supply, a container (e.g., a 5-gallon water jug, a refillable reservoir, or the like), or any other like source of water. The main conduit 14 may be a continuous pipe or tubing, although the main conduit 14 may alternatively be formed by a series of separate pipes or tubes designed to lead water received at the source intake 12 downstream toward a spigot 13 or other outlet from which a user may obtain the final filtered and/or enhanced water. The main conduit 14 or portions thereof can be rigid, flexible, or combinations thereof.

One or more filters 16 may be in selectable fluid communication with the main conduit 14. In the example embodiment shown in FIG. 1, a series of five filters 16a-16e is shown connected to the main conduit 14, but any number of filters may be used, as desired. The filters 16a-16e may be quick change filters, sump filters, in-line filters, combinations thereof, or the like. One or more of the filters 16a-16e may be configured to provide filtration to the water, such as by sediment, carbon, reverse osmosis, or the like. One or more of the filters 16a-16e may be configured to provide additives to the water, such as minerals, electrolytes, alkalinity, vitamins, fluoride, caffeine, flavors, combinations thereof, or the like. Each filter 16a-16e may include an inlet 20 for receiving water from the main conduit 14 and an outlet 22 for sending treated water back into the main conduit 14.

Each filter 16a-16e may be connected to the main conduit by an electrically controlled valve 18 (e.g., a solenoid valve or the like). For example, as shown in FIG. 1, the inlet 20 of each filter 16a-16e connects to the main conduit 14 by its own valve 18. When operated, a valve 18 can either divert water from the main conduit into the corresponding filter 16a, or can allow the water to bypass the respective filter 16a when the functionality of that filter 16a is not selected by the user, as will be described in further detail below. In some embodiments, each outlet 22 may include a check valve (see e.g., FIG. 2) to prevent water from the main conduit 14 from entering the respective filter 16a-e through the outlet 22. While the valves 18 are shown connected directly and solely to the inlets 20 of each filter 16a-16e in FIG. 1, the valves 18 may be indirectly connected thereto, or the valves 18 may alternatively connect to both the inlets 20 and outlets 22. In other embodiments, each inlet 20 and outlet 22 may have its own separate electrically controllable valve. Other arrangements are available as well for fluidly connecting a filter to the main conduit 14 only when a user selects the functionality of that particular filter and bypassing a filter when not selected.

Figure 2:
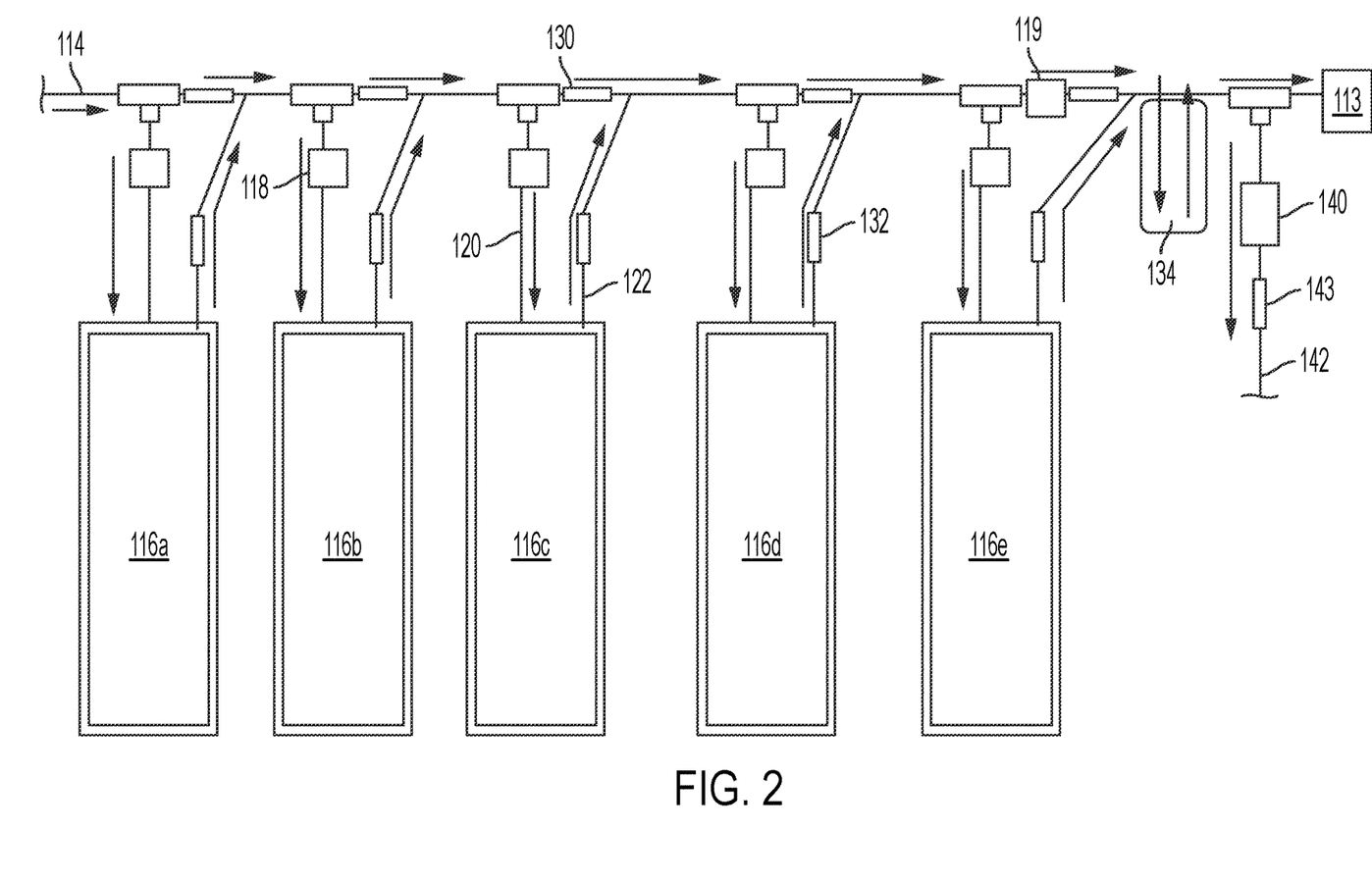
FIG. 2 is a schematic block diagram of a second example embodiment of a water-dispensing device in accordance with the present invention.

FIG. 2 shows a second example embodiment of a water-dispensing device, and specifically potential internal fluid paths thereof. Arrows in FIG. 2 are provided to illustrate the flow direction through the various components of the device. As with the embodiment in FIG. 1, the device in FIG. 2 may include a main conduit 114 connected via solenoid or similar electrically-actuated valves 118 to inlets 120 of five filters 116a-e, each of which returns filtered and/or enhanced water to the main conduit 114 via an outlet 122. It is contemplated that there may be more or less filters connected in the system. The device in FIG. 2 may also include a series of check valves 130, each positioned in the main conduit 114 downstream of the inlet 120 of a filter 116 but upstream of the respective outlet 122. This can prevent water from flowing backward toward an inlet 120. Similarly, as described above, each outlet 122 may also be connected to a check valve 132 to prevent reverse flow into the respective filter 116a-e.

The water may also be passed through a conditioning element 134. For example, the conditioning element may be a direct chill tank for cooling the filtered/enhanced water to a desirable temperature. Direct chill tanks are conventionally known. In some other embodiments, the conditioning element 134 may be a water heater. In some other embodiments, both a direct chill tank and a water heater may be provided, and the water may be routed to the appropriate conditioning element via valves (not shown) depending on the user's selection. In these embodiments, the conditioning element 134 may be located along the main conduit 114 downstream of the filters 116a-e. A solenoid or other-type of electronically actuable valve 119 may be located upstream of the conditioning element 134, such as between the inlet 120 and outlet 122 of the last filter 116e, and in particular, upstream of the check valve 130 associated with the last filter 116e. However, such a valve 119 can be placed elsewhere in the system as needed. In still further embodiments, the conditioning element 134 may be a holding tank (not shown) used for chilling or heating the water. In those embodiments, the conditioning element 134 may be located upstream of the filters 116a-e.

The filters 116a-e shown and described above may be termed as "optional" filters—i.e., water only passes through one or more of the filters 116a-e when its function is selected by the user. However, in some embodiments there may also be one or more "required" filters (not shown) through which the water will always pass regardless of selection by the user. For example, water might always pass through a filter for lead. In such embodiments, the one or more "required" filters may be placed upstream or downstream of the "optional" filters 116a-e, as desired, or may even be interspersed in between.

By allowing a user to select which of the filters 116a-e to use when dispensing water, certain of the filters 116a-e may go unused for long stretches of time. As a result, water can become stagnant in the respectively unused filter and any lines connected thereto. To avoid dispensing stagnant water, it may be desirable to allow for a periodic purging of the system. In FIG. 2, this may be enabled by a purge valve 140 located downstream of the filters 116a-e and conditioning element 134. The purge valve 140 may be similar to the valves 118 used for the filters 116a-e, and is preferably electrically actuated when purging is desired. The purge valve 140 allows for water that has been cycled through one or more of the filters 116a-e to be diverted to a disposal line 142, which can lead to a drain, sewage line, or the like (not shown). A check valve 143 may be placed in the disposal line 142 downstream of the purge valve 140 to prevent any reverse flow. A purge may be scheduled for periodic, automatic execution and/or may be selectable on demand by a user. The purge may involve running water through one or more of the filters 116a-e, which may be selectable for pre-programmed scheduling or on demand purging.

While the purge valve 140 is shown in FIG. 2 as being located between the conditioning element 134 and the spigot 113, which allows for a simple, full purge of the system, other embodiments contemplate differing configurations for purging. For example, a separate purge valve (not shown) may be coupled to each outlet 122 of each filter 116a-e, to allow for individual filter purging to a common disposal line 142 or the like. Purge valves can be utilized with other individual elements or combinations of elements in the system as well.

Referring again to FIG. 1, valves (e.g., such as valves 18 in FIG. 1 or one or more of the valves shown in FIG. 2) may be operated by at least one controller 15, which may by a microcontroller unit (MCU), a central processing unit (CPU), a microprocessor, an application specific controller (ASIC), a programmable logic array (PLA), combinations thereof, or the like. The controller 15 may include or be coupled to a memory (not shown) that may store code or software for carrying out processes described herein and/or carrying out other operations of the water-dispensing device 10 and may store any captured data for later transfer to remote or external devices. It should be further appreciated that controller 15 is shown schematically in this example as a single component, but may include a plurality of individual devices, with control functions divided among the individual devices.

The controller 15 may be in communication with a user interface 17, which may take the form of a touchscreen, push buttons, switches, combinations thereof, or the like integrated into or onto the water-dispensing device 10. In other embodiments, the controller 15 may be in wired communication (e.g., via USB, Ethernet, IEEE 1394, or the like) or wireless communication (e.g., via WI-FI, BLUETOOTH, ZIGBEE, Z-WAVE, 3G, 4G, or 5G cellular, infrared, or the like) with an external device (not shown), such as a smartphone, laptop, tablet, desktop, or the like. Preferably, the user is able to make selections for filtering and/or enhancing dispensed water via the user interface 17, which may be received by the controller 15 and used to actuate appropriate valves 18 and other components to match the user selection.

In some embodiments, the filters 16a-16e, valves 18, controller 15, and at least a portion of the main conduit 14, as well as other components for treating the water, may be disposed within a common housing 11, which may also support the user interface 17 and the spigot 13 on an outer surface thereof. The housing 11 may be made from conventional materials, such as plastic, stainless steel, combinations thereof, or the like. The housing 11 may include one or more access panels (not shown) for servicing various components, changing filters 16a-16e, or the like. However, it is also contemplated that various components may be distributed throughout multiple separate housings, such as when the water-dispensing device 10 is modular in nature. In still other embodiments, various components may be located outside of any dedicated housing.

Figure 3:
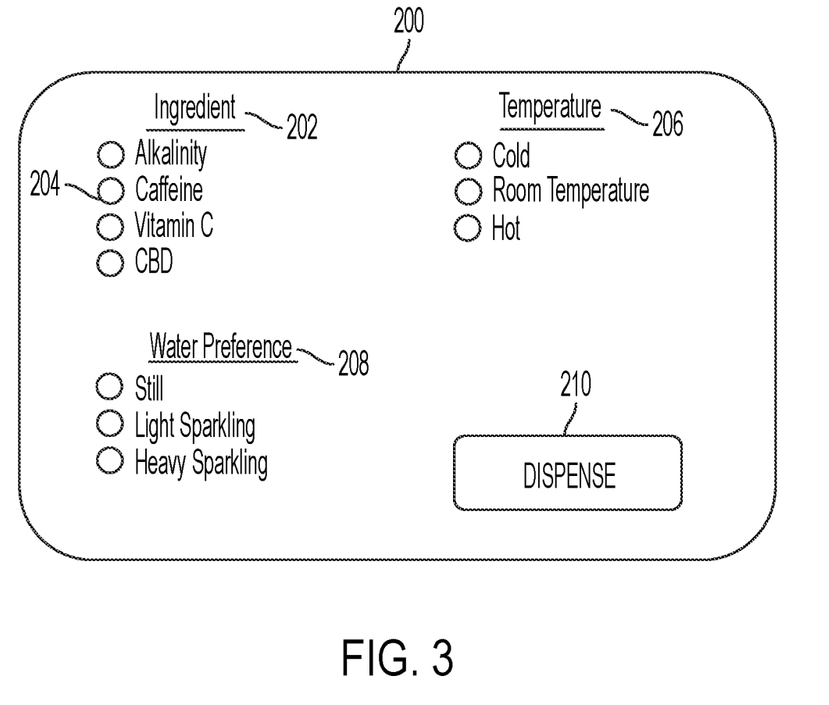
FIG. 3 is a first example embodiment of a touchscreen for use with a water-dispensing device in accordance with the present invention.

FIG. 3 shows an example embodiment of a touchscreen 200 that may serve as a user interface for the water-dispensing device 10. For example, a list of potential ingredients 202 is shown for selection, each having a corresponding touch-selectable radio button 204. The user may be able to select one or more of the listed ingredients 202 for enhancing dispensed water. Based on the selection(s) made, the controller 15 may actuate the appropriate valves to permit or prevent water from flowing through particular filters according to the selected ingredients 202. The controller 15 may associate a particular filter with an ingredient (or similar type of) selection via preset programming. For example, the controller 15 may be programmed such that a filter 16a installed in a first position is designated as being for caffeine. However, if an operator mistakenly places the wrong filter in this location, the controller 15 may not recognize the error. Accordingly, in some embodiments, when a filter 16a-16e is installed, confirmation may be required. For example, an operator may need to scan a machine-readable code, e.g., a bar code, QR code, RFID code, or the like (not shown), on the filter to confirm with the controller 15 that it matches the recognized type for the given location. The water-dispensing device 10 may have optical or radio tag readers (not shown) installed in one or more locations specifically for this purpose. In some other embodiments, it may be desirable to periodically swap filters for more popular selections. In those instances, an operator may manually input the designation of a filter as it is installed or may scan a machine-readable code on the filter for the same purpose. In some other embodiments, each filter may have a wireless tag (e.g., an RFID tag, NFC tag, or the like, not shown) to communicate with the controller 15 in real-time so that the controller 15 recognizes the type of filter that is installed. This information may also be displayed to an end user or operator, for example, via the user interface 17 or external device, if desired.

The touchscreen 200 may also provide a list of selectable temperatures 206 for the dispensed water. Based on the selection by the user, the controller 15 may route the water, via appropriate valves, to a water heater or water cooler, or may draw water from an appropriate hot or cold water reservoir, as necessary. The touchscreen 200 may also present a list of preferences related to carbonation 208 of the water. Based on the selection by the user, the controller 15 may route the water, via appropriate valves, to a carbonation injector (not shown) or the like. Once a user has made all of the necessary selections via the touchscreen 200, the user may press the "dispense" icon 210. In some embodiments, the user may continuously keep a finger on the dispense icon 210 until a desired amount of water is dispensed. In other embodiments, pressing the dispense icon 210 once causes a predetermined amount of water to be dispensed. In still other embodiments, a user may select an amount of water to be dispensed, which is then output following selection of the dispense icon 210.

Selections may be stored and remain active for the next dispensing operation. For example, in such embodiments, the next user would have to change selections of the various choices for water filtration/enhancement from the previous settings, rather than starting anew. In other embodiments, the selections may be reset following a dispense operation. In still other embodiments, the controller 15 may recognize the current user, such as by an input through the user interface 17 or an external device, or automatically via an external device, for example. In those instances, a pre-set customized selection may be made available through identification of the user.

While the ingredient, temperature, and water preference listings 202, 206, 208 in FIG. 3 are all displayed on the same screen, the listings 202, 206, 208 may be presented sequentially on separate screens. Other types of selection listings can be made as well on the touchscreen 200, either on the same or separate screens from what is shown in FIG. 3.

Figure 4:
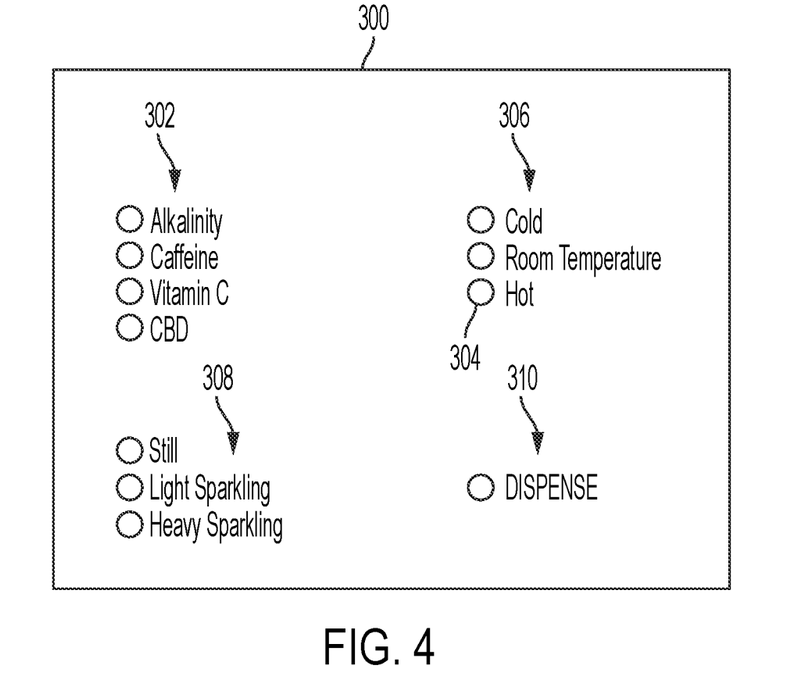
FIG. 4 is an example embodiment of a selection panel for use with a water-dispensing device in accordance with the present invention.

FIG. 4 shows an example of a selection panel 300 that may serve as a user interface for the water-dispensing device 10. Ingredient listings 302, temperature listings 306, and water preference listings 308 are all the same as in the touchscreen 200 of FIG. 3. However, the touchscreen 200 is replaced by physical buttons 304 that can be physically depressed or actuated for making selections. In some embodiments, the buttons 304 may light up or change color when selected to indicate the present settings for filtering/enhancing the water. A dispense button 310 causes the selected water to be dispensed, as described above. Similar to the touchscreen 200, selections made using the selection panel 300 may remain in place for a subsequent dispense operation or may be reset.

Figure 5:
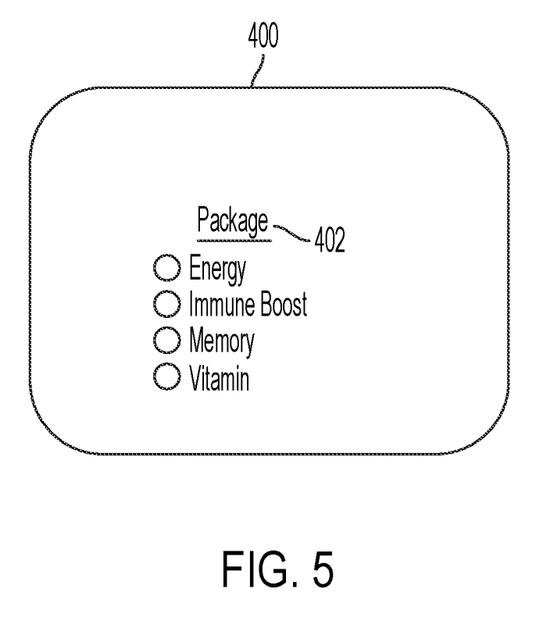
FIG. 5 is a second example embodiment of a touchscreen for use with a water-dispensing device in accordance with the present invention.

Rather than requiring users to select individual filters for treating the water, the water-dispensing device 10 may offer predetermined combinations. For example, FIG. 5 shows an example embodiment of a touchscreen 400 providing a package listing 402 that allows automatic selection of one or more filters based on desired physical benefits offered by the resulting water. For example, packages may be offered for water that increases energy, provides an immunity boost, enhances memory characteristics, provides vitamin supplements, or the like. Upon selection of a package, the controller 15 may actuate appropriate valves to the filters associated with the selected package.

Figure 6:
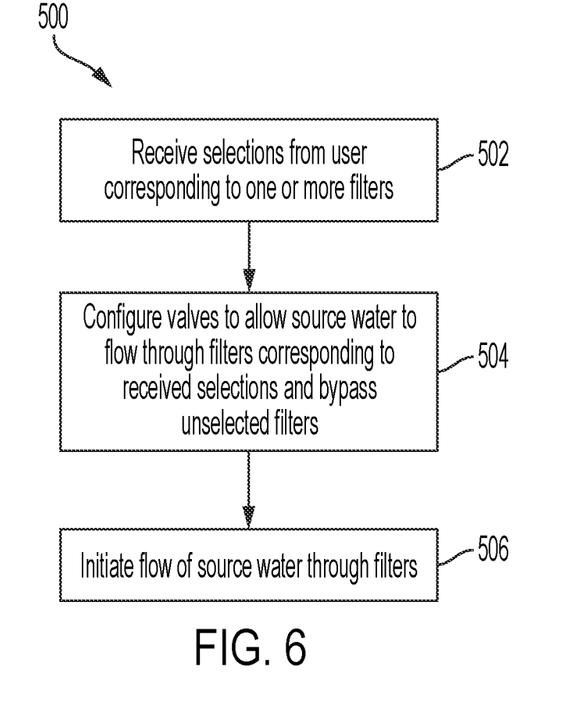
FIG. 6 is a flow chart illustrating an example embodiment of a method for dispensing filtered/enhanced water for use with a water-dispensing device in accordance with the present invention.

FIG. 6 is a flow chart showing an example method 500 for dispensing filtered/enhanced water that may be performed by the controller 15 of the water-dispensing device. At step 502, the controller 15 may receive selections from the user, via the user interface 17, for example, corresponding to one or more of the filters. At step 504, the controller 15 may configure the valves (e.g., valves 18) to allow source water to flow through filters that correspond to the received selections. Filters corresponding to unselected options may be bypassed based on the valve configuration set by the controller 15. At step 506, the controller 15 may initiate flow of source water through the filters. For example, this step may be performed in response to receiving a dispense instruction from the user via the user interface 17.

Additional menus and other operations may be provided through a user interface 17, including for scheduling or performing purging operations, cleaning, filter replacement, programming, updating firmware, and the like.

Figure 7:
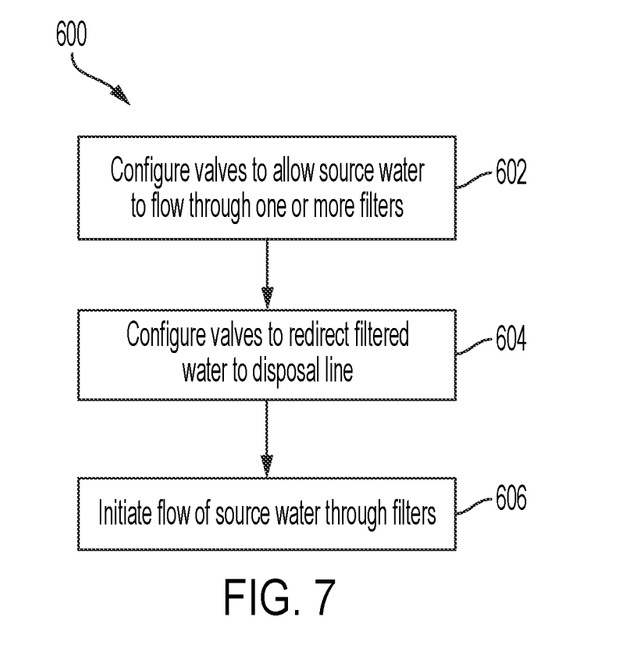
FIG. 7 is a flow chart illustrating an example embodiment of a method for purging a water-dispensing device in accordance with the present invention.

FIG. 7 is a flow chart showing an example method 600 for purging a water-dispensing device. At step 602, the controller 15 may configure the valves (e.g., valves 118) to allow source water to flow through one or more of the filters that are to be purged. At step 604, the controller 15 may also configure the valves (e.g., purge valve 140) to redirect filtered water toward the disposal line 142. At step 606, the controller 15 may initiate flow of source water through the filters. This may be done automatically at predetermined or pre-scheduled times or in response to a selection by a user for completing a purge operation.

While certain filters 116*a*-*e* may go unused for long stretches based on user selections, other filters 116*a*-*e* may be selected more frequently and therefore become exhausted more quickly. In some embodiments, the water-dispensing device 10 may communicate to a user or operator, via the user interface 17, external device, or the like, that certain filters are exhausted or close to exhausted and should be replaced.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein.

We claim:

1. A water-dispensing device comprising:
   a source water intake;
   a spigot arranged downstream from the source water intake;
   a first filter arranged between the source water intake and the spigot, the first filter including a first inlet and a first outlet, at least the first inlet including a first electrically controlled valve for selectively placing the first filter in fluid communication with the source water intake;
   a second filter arranged between the source water intake and the spigot, the second filter including a second inlet and a second outlet, at least the second inlet including a second electrically controlled valve for selectively placing the second filter in fluid communication with the source water intake; and
   a controller configured to:
   (i) in response to receiving a first water selection from a user, configure the first valve and the second valve such that water flowing from the source water intake toward the spigot will bypass both the first filter and the second filter,
   (ii) in response to receiving a second water selection from the user different from the first water selection, configure the first valve and the second valve such that water flowing from the source water intake toward the spigot will enter the first filter and bypass the second filter,
   (iii) in response to receiving a third water selection from the user different from the first and second water selections, configure the first valve and the second valve such that water flowing from the source water intake toward the spigot will bypass the first filter and enter the second filter, and
   (iv) in response to receiving a fourth water selection from the user different from the first, second, and third water selections, configure the first valve and the second valve such that water flowing from the source water intake toward the spigot will enter the first filter and then enter the second filter from the first filter.

2. The water-dispensing device of claim 1, further comprising a user interface in communication with the controller, the user interface providing a plurality of selectable options for the water selection, the plurality of selectable options including at least the first through fourth water selections.

3. The water-dispensing device of claim 2, wherein the user interface is a touchscreen.

4. The water-dispensing device of claim 2, wherein the user interface further provides an option for selectively dispensing water from the spigot according to the water selection.

5. The water-dispensing device of claim 1, wherein the second filter is configured to provide an additive to the water.

6. The water-dispensing device of claim 5, wherein the additive is at least one of a mineral, an electrolyte, alkalinity, a vitamin, fluoride, caffeine, a flavor, or a combination of two or more of the foregoing.

7. The water-dispensing device of claim 1, further comprising:
   a drain line arranged downstream of the first and second filters and upstream of the spigot; and
   a purge valve configured to selectively divert water from the source water intake to the drain line.

8. The water-dispensing device of claim 7, wherein the controller is further configured to perform a purging operation, the purging operation comprising:
   (i) configuring the first valve and the second valve to allow water flowing from the source water intake toward the spigot to enter each of the first and second filters,
   (ii) actuating the purge valve to a position for diverting the water from the source water intake toward the drain line, and
   (iii) initiating water flow from the source water intake.

9. The water-dispensing device of claim 1, further comprising a conditioning element arranged between the source water intake and the spigot.

10. The water-dispensing device of claim 9, wherein the conditioning element is one of a chill tank or a water heater.

11. The water-dispensing device of claim 1, wherein the first filter is one of a sediment filter, a carbon filter, or a reverse osmosis filter.

12. The water-dispensing device of claim 1, wherein the first and second outlets each include a check valve to prevent water from flowing into the respective first and second filters through the respective first and second outlets.

13. The water-dispensing device of claim 1, further comprising one or more additional filters, each of the one or more additional filters being arranged between the source water intake and the spigot and including an inlet and an outlet, at least the inlet of each of the one or more additional filters including an additional electrically controlled valve for selectively placing the respective additional filter in fluid communication with the source water intake.

14. A method for operating a water-dispensing device having a controller and first and second filters arranged between a source water intake and a downstream spigot, the first filter having a first inlet and a first outlet, at least the first inlet including a first electrically controlled valve, the second filter having a second inlet and a second outlet, at least the second inlet including a second electrically controlled valve, the method comprising:
   receiving, by the controller, a water selection from a user;
   configuring, by the controller:
   (i) the first valve and the second valve such that water flowing from the source water intake toward the spigot will bypass both the first filter and the second filter in response to receiving a first water selection from a user,
   (ii) the first valve and the second valve such that water flowing from the source water intake toward the spigot will enter the first filter and bypass the second filter in response to receiving a second water selection from the user different from the first water selection,
   (iii) the first valve and the second valve such that water flowing from the source water intake toward the spigot will bypass the first filter and enter the second filter in response to receiving a third water selection from the user different from the first and second water selections, and
   (iv) the first valve and the second valve such that water flowing from the source water intake toward the spigot will enter the first filter and then enter the second filter from the first filter in response to receiving a fourth water selection from the user different from the first, second, and third water selections; and
   initiating, by the controller, water flow from the source water intake.

15. The method of claim 14, wherein the water-dispensing device further includes a drain line arranged downstream of the first and second filters and upstream of the spigot and a purge valve for performing a purging operation, the method further comprising:
   configuring, by the controller, the first valve and the second valve to allow water flowing from the source water intake toward the spigot to enter each of the first and second filters;
   actuating, by the controller, the purge valve to a position for diverting the water from the source water intake toward the drain line; and
   initiating, by the controller, water flow from the source water intake.

16. The method of claim 15, wherein the actuating of the purge valve for diverting water toward the drain line is performed in response to the controller determining that a predetermined or pre-scheduled time for a purging operation has been reached.

17. The method of claim 15, wherein the actuating of the purge valve for diverting water toward the drain line is performed in response to the controller receiving a selection by the user for completing a purging operation.

18. The method of claim 14, wherein the water-dispensing device further includes one or more additional filters, each of the one or more additional filters being arranged between the source water intake and the spigot and including an inlet and an outlet, at least the inlet of each of the one or more additional filters including an additional electrically controlled valve.

* * * * *